United States Patent
Jiang

(10) Patent No.: US 10,425,918 B2
(45) Date of Patent: Sep. 24, 2019

(54) RESOURCE ALLOCATION METHOD AND DEVICE, USER EQUIPMENT AND BASE STATION

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 66 days.

(21) Appl. No.: 15/872,473

(22) Filed: Jan. 16, 2018

(65) Prior Publication Data
US 2018/0206212 A1    Jul. 19, 2018

(30) Foreign Application Priority Data
Jan. 13, 2017  (CN) .......................... 2017 1 0025552

(51) Int. Cl.
*H04W 72/04*   (2009.01)
*H04W 72/12*   (2009.01)

(52) U.S. Cl.
CPC ......... *H04W 72/04* (2013.01); *H04W 72/042* (2013.01); *H04W 72/1268* (2013.01); *H04W 72/1284* (2013.01)

(58) Field of Classification Search
None
See application file for complete search history.

(56) References Cited

U.S. PATENT DOCUMENTS

| | | | | |
|---|---|---|---|---|
| 8,526,310 B2* | 9/2013 | Dinan | ............... | H04W 56/0005 370/236 |
| 2010/0070814 A1* | 3/2010 | Damnjanovic | ......... | H04L 1/188 714/748 |
| 2010/0254340 A1* | 10/2010 | Park | .................. | H04W 72/1284 370/329 |

(Continued)

FOREIGN PATENT DOCUMENTS

| | | |
|---|---|---|
| CN | 101772049 A | 7/2010 |
| CN | 101873704 A | 10/2010 |

(Continued)

OTHER PUBLICATIONS

Chinese Office Action (including English translation) issued in CN201710025552.1, dated Aug. 8, 2018, 18 pages.

(Continued)

*Primary Examiner* — Candal Elpenord
(74) *Attorney, Agent, or Firm* — Arch & Lake LLP

(57) ABSTRACT

The present disclosure provides a resource allocation method, and a user equipment. The method includes: in an inactive state, triggering a buffer status report (BSR) event to send a second BSR to a base station when new service data are generated after a first BSR is sent to the base station; when detecting that a first uplink resource is available, sending the second BSR and cached first service data to the base station based using the first uplink resource; when detecting that the first uplink resource is not available, sending a scheduling request (SR) to the base station according to at least one SR resource allocated by the base station, and sending the second BSR and the first service data to the base station using the second uplink resource.

19 Claims, 6 Drawing Sheets

(56) References Cited

U.S. PATENT DOCUMENTS

| | | | |
|---|---|---|---|
| 2011/0092201 A1* | 4/2011 | Lindstrom et al. | H04W 24/10 455/424 |
| 2012/0039263 A1* | 2/2012 | Moberg | H04W 72/1284 370/329 |
| 2013/0028223 A1 | 1/2013 | Kim | |
| 2013/0044699 A1* | 2/2013 | Eriksson | H04W 72/1289 370/329 |
| 2013/0242730 A1* | 9/2013 | Pelletier | H04W 28/0284 370/230 |
| 2015/0327116 A1* | 11/2015 | Zhang | H04W 72/1284 370/329 |
| 2016/0044653 A1* | 2/2016 | Bagheri | H04W 72/0413 370/329 |
| 2016/0066328 A1 | 3/2016 | Hu | |
| 2016/0323762 A1* | 11/2016 | Adachi | H04W 16/18 |

FOREIGN PATENT DOCUMENTS

| | | |
|---|---|---|
| CN | 102685895 A | 9/2012 |
| CN | 102781096 A | 11/2012 |
| CN | 104144512 A | 11/2014 |
| CN | 104823507 A | 8/2015 |
| CN | 105230103 A | 1/2016 |
| CN | 106856630 A | 6/2017 |
| EP | 2405617 A1 | 1/2012 |
| EP | 2688332 A2 | 1/2014 |
| WO | 2015109534 A1 | 7/2015 |

OTHER PUBLICATIONS

International Search Report and Written Opinion (including English translation) issued in PCT/CN2017/100238, dated Dec. 5, 2017, 14 pages.

Interdigital Communications: "UL and DL Data Transmission Procedures in Inactive State", 3GPP Draft; R2-1700235 (NR SI AI3222 Inactive DataTransmission Procedures), Jan. 7, 2017, 3rd Generation Partnership Project (3GPP), Mobile Competence Centre; 650, route des Lucioles ; F-06921 Sophia-Antipolis Cedex ; France Source info: vol. RAN WG2, Nr: Spokane, Wa; Jan. 17, 2017-Jan. 19, 2017; retrieved on Jan. 7, 2017.

European Extended Search Report and Opinion issued in EP18151690, dated May 29, 2018, 7 pages.

* cited by examiner

RESOURCE ALLOCATION METHOD AND DEVICE, USER EQUIPMENT AND BASE STATION

CROSS REFERENCE TO RELATED APPLICATION

This application is based on and claims priority to Chinese Patent Application Serial No. 201710025552.1, filed with the State Intellectual Property Office of P. R. China on Jan. 13, 2017, the entire content of which is incorporated herein by reference for all purposes.

TECHNICAL FIELD

The present disclosure relates to a communication technology field, and more particularly to, a resource allocation method, a resource device, a user equipment and a base station.

BACKGROUND

In the fifth generation mobile communication technology (5G for short), a third state (that is, an inactive state) of a user equipment (UE for short) is introduced on the basis of an idle state and a connected state of the UE. In the inactive state, the UE can send service data to a base station according to an uplink resource allocated by the base station.

SUMMARY

The present disclosure discloses methods and a user equipment.

According a first aspect of the present disclosure, a resource allocating method is provided. The method may be applied in a UE and may include: in an inactive state, triggering a buffer status report (BSR) event when new service data are generated after a first BSR is sent to a base station, where the BSR event is configured to indicate to send a second BSR to the base station, and the first BSR is configured to indicate a first amount of cached data of the UE before the new service data are generated and the second BSR is configured to indicate a second amount of cached data of the UE after the new service data are generated.

The method may also include: when detecting that a first uplink resource is available, sending the second BSR and cached first service data to the base station using the first uplink resource, where the base station allocates an uplink resource for the UE according to the second BSR, and the first uplink resource is allocated by the base station according to the first BSR; and when detecting that the first uplink resource is not available, sending a scheduling request (SR) to the base station according to at least one SR resource allocated by the base station where the base station allocates a second uplink resource for the UE according to the SR, and the at least one SR resource is allocated by the base station according to a random access request of the UE, and sending the second BSR and the first service data to the base station using the second uplink resource where the base station allocates the uplink resource for the UE according to the second BSR.

According a second aspect of the present disclosure, a resource allocating method is provided. The method may be applied in a base station and may include: when a UE is in an inactive state, allocating a first uplink resource for the UE according to a first BSR when receiving the first BSR from the UE; sending configuration information of the first uplink resource to the UE; allocating an uplink resource for the UE according to a second BSR when receiving the second BSR and first service data from the UE on the first uplink resource; and allocating a second uplink resource for the UE according to a SR when receiving the SR of the UE, and allocating the uplink resource for the UE according to the second BSR when receiving the second BSR and the first service data on the second uplink resource.

The method may also include: the second BSR is sent by the UE when the UE detects that new service data are generated, and the first BSR is configured to indicate a first amount of cached data of the UE before the new service data are generated and the second BSR is configured to indicate a second amount of cached data of the UE after the new service data are generated.

According a third aspect of the present disclosure, a user equipment is provided. The user equipment may include a processor; and a memory storing instructions that are executable by the processor. The processor may be configured to in an inactive state, trigger a BSR event when new service data are generated after a first BSR is sent to a base station, where the BSR event is configured to indicate to send a second BSR to the base station, and the first BSR is configured to indicate a first amount of cached data of the UE before the new service data are generated and the second BSR is configured to indicate a second amount of cached data of the UE after the new service data are generated.

The processor may also be configured to send the second BSR and cached first service data to the base station using a first uplink resource when detecting that the first uplink resource is available, where the base station allocates an uplink resource for the UE according to the second BSR, and the first uplink resource is allocated by the base station according to the first BSR; and send a SR to the base station according to at least one SR resource allocated by the base station when detecting that the first uplink resource is not available, where the base station allocates a second uplink resource for the UE according to the SR, and the at least one SR resource is allocated by the base station according to a random access request of the UE, and send the second BSR and the first service data to the base station using the second uplink resource, where the base station allocates the uplink resource for the UE according to the second BSR.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

Figure 1:
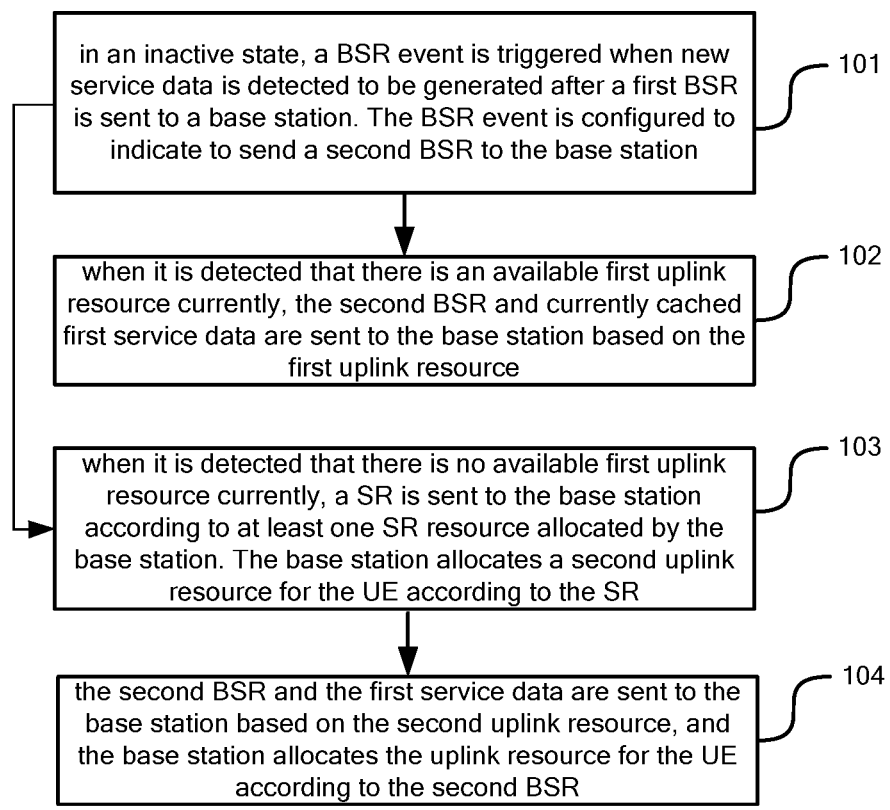
FIG. 1 is a flow chart illustrating a resource allocation method according to an example.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

In order to make the purpose, the technical solution and advantages of the present disclosure more clear, reference will be made in detail to describe examples of the present disclosure with accompanying drawings.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

Reference will now be made in detail to examples, which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of apparatuses and methods consistent with aspects related to the present disclosure as recited in the appended claims.

When a user equipment (UE) in the inactive state has service data that need to be sent to the base station, the UE triggers a random access process by sending a random access request to the base station. The base station allocates the uplink resource for the UE through the random access process. The allocated uplink resource can at least satisfy a transmission of a buffer status report (BSR for short). The BSR is configured to indicate an amount of data locally cached in the UE. The UE sends a small portion of the service data and the BSR to the base station according to the allocated uplink resource. The base station continues to allocate the uplink resource for the UE according to the BSR, so that the UE sends remaining service data according to the uplink resource allocated by the base station. When new service data are generated after the UE sends the service data to the base station, the UE still needs to trigger the random access process, and the base station allocates the uplink resource for the UE through the random access process, so as to enable the base station to allocate the uplink resource for the new service data.

FIG. 1 is a flow chart illustrating a resource allocation method according to an example. As illustrated in FIG. 1, the method is applied in a user equipment (UE for short) and includes following acts.

At block 101, in an inactive state, a buffer status report (BSR for short) event is triggered when new service data is detected to be generated after a first BSR is sent to a base station. The BSR event is configured to indicate to send a second BSR to the base station. The first BSR is configured to indicate a first amount of cached data of the UE before new service data is generated. The second BSR is configured to indicate a second amount of cached data of the UE after the new service data is generated.

At block 102, when it is detected that there is an available first uplink resource currently, the second BSR and currently cached first service data are sent to the base station based on the first uplink resource. The base station allocates an uplink resource for the UE according to the second BSR, the first uplink resource is allocated by the base station according to the first BSR.

At block 103, when it is detected that there is no available first uplink resource currently, a scheduling request (SR for short) is sent to the base station according to at least one SR resource allocated by the base station. The base station allocates a second uplink resource for the UE according to the SR. The at least one SR resource is allocated by the base station according to a random access request of the UE.

At block 104, the second BSR and the first service data are sent to the base station based on the second uplink resource. The base station allocates the uplink resource for the UE according to the second BSR.

With the method according to examples of the present disclosure, when the new service data is generated in the UE, the BSR event is triggered, and an updated BSR may be sent to the base station timely according to the available uplink resource or uplink resource requested according to the SR resource allocated by the base station, so that the base station can continue to allocate the uplink resource for the UE according to the updated BSR, without initiating a random access process by the UE, thereby improving efficiency of resource allocation and reducing signaling overhead.

In an alternative implementation, before the BSR event is triggered, the method further includes followings.

When configuration information of the first uplink resource is received, it is determined whether an amount of data that the first uplink resource can transmit is larger than a given percentage of the first amount of cached data according to the configuration information of the first uplink resource. When the given percentage of the first amount of cached data is larger than the given percentage of the first amount of cached data, the act of triggering the BSR event is performed.

In an alternative implementation, before the second BSR is sent based on the first uplink resource, the method further includes followings.

It is determined whether the amount of data that the first uplink resource can transmit is larger than or equal to the second amount of cached data. When the amount of data that the first uplink resource can transmit is larger than or equal to the second amount of cached data, the act that the second BSR and the first service data are sent based on the first uplink resource is performed When the amount of data that the first uplink resource can transmit is less than the second amount of cached data, the BSR event is canceled, and the first service data is sent based on the first uplink resource.

In an alternative implementation, the act that the SR is sent to the base station according to at least one SR resource allocated by the base station includes followings.

A given SR resource that can satisfy the second amount of cached data is determined from the at least one SR resource according to the second amount of cached data and a SR resource type. Different SR resource types correspond to different resource sizes. The SR is sent on the given SR resource.

In an alternative implementation, before the SR is sent on the given SR resource, the method further includes followings.

It is detected whether the given SR resource is in an occupied state. When the SR resource is in the occupied state, the act of sending the SR on the given SR resource after the SR resource is put of the occupied state is performed. When the SR resource is not in the occupied state, the act of sending the SR on the given SR resource is performed.

In an alternative implementation, the act that it is detected whether the given SR resource is in the occupied state includes followings.

It is detected whether a timer of the given SR resource is in an operating state. It is determined that the SR resource is in the occupied state when the timer of the given SR resource is in the operating state.

In an alternative implementation, the method further includes followings.

In the inactive state, the random access request is sent to the base station when it is detected that there is service data need to be sent. After the base station receives the random access request, the base station allocates a third uplink resource and the at least one SR resource for the UE according to a service type of a service supported by the UE. Currently cached second service data and the first BSR are sent to the base station according to the third uplink resource.

In an alternative implementation, after the second BSR and first service data are sent to the base station, the method further includes followings.

A given bearer is determined from a plurality of bearers established with the base station according to the service type of the first service data. The given bearer is configured to transmit the first service data. A timer of the given bearer is started to make the timer of the given bearer enter an operating state.

In an alternative implementation, before the timer of the given bearer is started, the method further includes followings.

Timer configuration information of the base station is received. The timer configuration information is configured to indicate timer duration of each bearer of the plurality of bearers. A timer of each bearer is configured according to the timer duration of each bearer.

In an alternative implementation, the method further includes followings.

The operating states of the timers of the plurality of bearers are detected. When it is detected that the timers of the plurality of bearers are all in a non-operating state, monitoring a physical downlink control channel (PDCCH for short) is stopped, or when a stop-monitoring instruction is received from the base station, monitoring the PDCCH is stopped.

All of the alternative examples described above may be used in any combination to form alternative examples of the present disclosure, which will not be described in detail herein.

Figure 2:
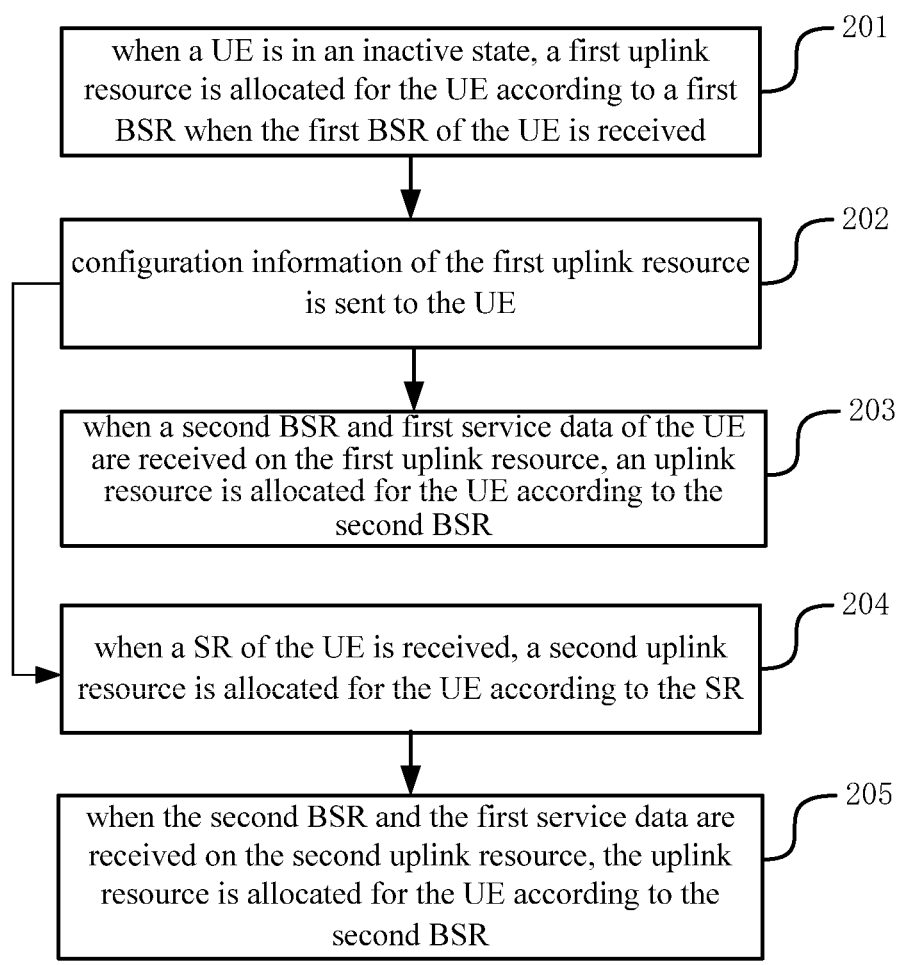
FIG. 2 is a flow chart illustrating a resource allocation method according to another example.

FIG. 2 is a flow chart illustrating a resource allocation method according to another example. As illustrated in FIG. 2, the method is applied in a base station and includes followings.

At block 201, when a UE is in an inactive state, a first uplink resource is allocated for the UE according to a first BSR when the first BSR of the UE is received.

At block 202, configuration information of the first uplink resource is sent to the UE.

At block 203, when a second BSR and first service data of the UE are received on the first uplink resource, an uplink resource is allocated for the UE according to the second BSR.

At block 204, when a SR of the UE is received, a second uplink resource is allocated for the UE according to the SR.

At block 205, when the second BSR and the first service data are received on the second uplink resource, the uplink resource is allocated for the UE according to the second BSR.

The second BSR is sent by the UE when the UE detects that new service data is generated. The first BSR is configured to indicate a first amount of cached data of the UE before the new service data is generated. The second BSR is configured to indicate a second amount of cached data of the UE after the new service data is generated.

With the method according to examples of the present disclosure, by allocating the SR resource for the UE, the BSR event can be triggered when the new service data is generated in the UE, and an updated BSR can be sent to the base station timely according to the available uplink resource or uplink resource requested according to the SR resource allocated by the base station, so that the base station can continue to the allocate uplink resource for the UE according to the updated BSR, without initiating a random access process by the UE, thereby improving efficiency of resource allocation and reducing signaling overhead.

In an alternative implementation, the act that the second uplink resource is allocated for the UE according to the SR includes followings.

A resource size indicated by the SR is determined according to a SR resource type of the SR. The second uplink resource satisfying the resource size is allocated for the UE.

In an alternative implementation, the method further includes followings.

A random access request of the UE is received. A third uplink resource is allocated for the UE. The UE sends the first BSR on the third uplink resource. At least one SR resource is allocated for the UE according to a service type of a service supported by the UE. A given message is sent to the UE. The given message carries configuration information of the third uplink resource and the SR resource type of the at least one SR resource. Different SR resource types are configured to indicate the base station to allocate uplink resources of different sizes.

In an alternative implementation, the act that at least one SR resource is allocated for the UE according to the service type of the service supported by the UE includes followings.

An amount of service data that the UE can send is determined according to the service type of the service supported by the UE. The at least one SR resource is allocated according to the amount of service data.

In an alternative implementation, the act that an uplink resource is allocated for the UE according to the second BSR includes followings.

When it is detected that the UE has no available first uplink resource currently, an uplink resource capable that can satisfy the second amount of cached data indicated by the second BSR is allocated for the UE. When it is detected that the UE has available first uplink resource currently, newly-increased amount of cached data of the UE are determined according to the second BSR and the first uplink resource. An uplink resource that can satisfy the newly-increased amount of cached data is allocated for the UE.

In an alternative implementation, the method further includes followings.

When it is detected that the UE needs to enter the inactive state, a plurality of bearers of the UE that have a capacity to perform data transmission in the inactive state are determined. For each bearer of the plurality of bearers, timer duration is configured for the bearer according to a feedback type corresponding to the bearer. Timer configuration information is sent to the UE. The timer configuration information is configured to indicate timer duration of each bearer of the plurality of bearers. The UE configures a timer of each bearer according to the timer configuration information.

All of the alternative examples described above may be used in any combination to form alternative examples of the present disclosure, which will not be described in detail herein.

Figure 3:
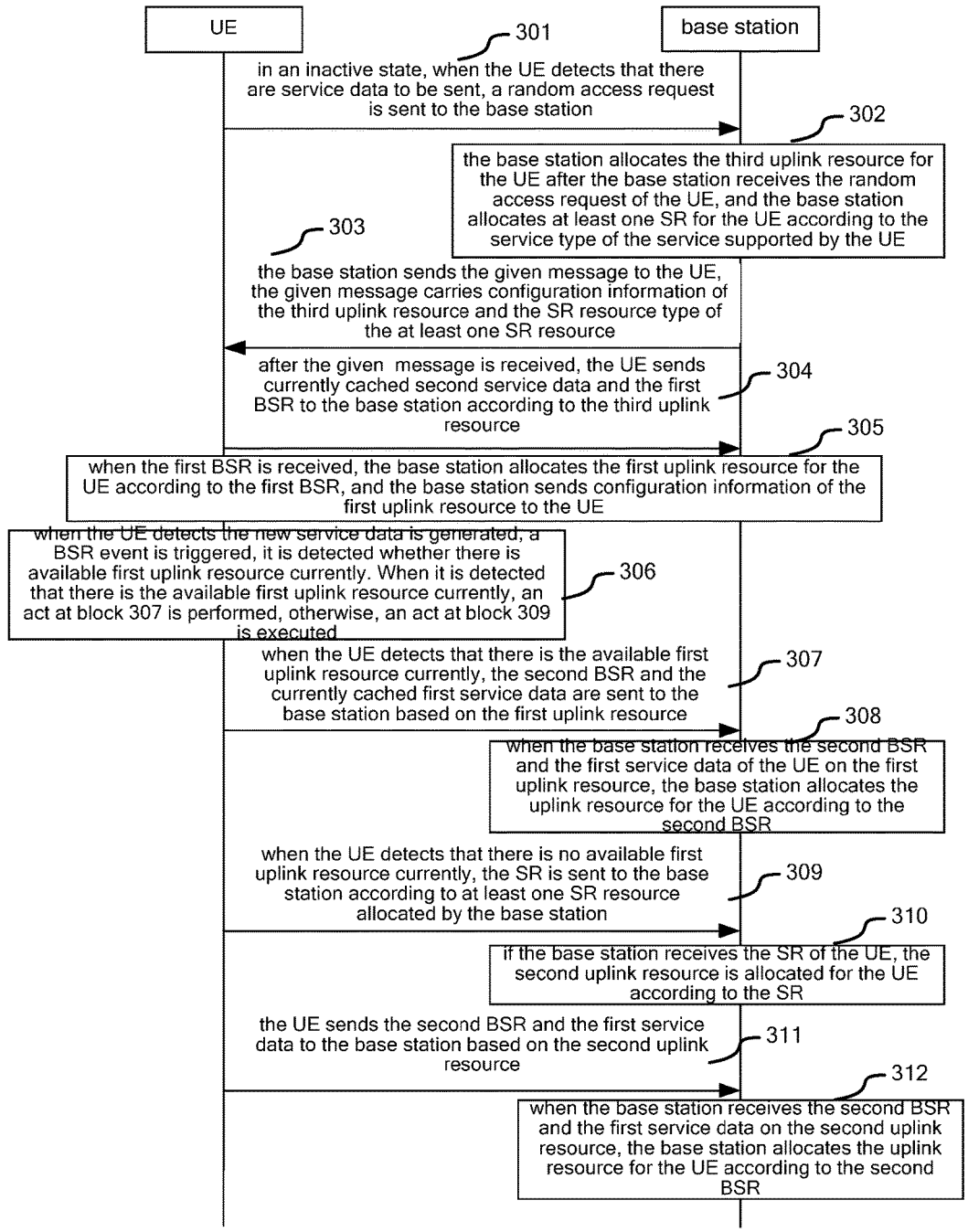
FIG. 3 is a flow chart illustrating a resource allocation method according to a further example.

FIG. 3 is a flow chart illustrating a resource allocation method according to a further example. As illustrated in FIG. 3, interaction bodies involved in the method are an UE and a base station, and the method includes followings.

At block 301, in an inactive state, when the UE detects that there are service data to be sent, a random access request is sent to the base station.

When the UE completes one data interaction with the base station in a connected state, the base station can determine whether to allow the UE to enter an inactive state according to saved context information of the UE. The context information includes a service type of a service supported by the UE and configuration information of an allocated bearer corresponding to each service type. When the base station determines that there is a special service having a capacity to transmit data in the inactive state in the service supported by the UE, the base station may send an inactive state instruction to the UE. The UE enters the inactive state after the inactive state instruction is received.

When the UE is in the inactive state, and when it is detected that there is service data to be sent, the UE may request an uplink resource from the base station through a random access process. For example, the UE can send the random access request to the base station to initiate the random access process. It should be noted that, the random access process may be a two-step random access process, or may also be a four-step random access process. When the random access process is the two-step random access process, the random access request sent by the UE carries an equipment identity of the UE, so that the base station can determine that the received random access request is sent by the UE. The equipment identity may be a factory serial number of the UE, an identity of a subscriber identity module (SIM for short) card installed on the UE, or a user account logged in the UE. The example is not limited thereto.

The base station may determine whether there is the special service in the service supported by the UE according to auxiliary information or subscription information of the UE. The auxiliary information or the subscription information may include a size range of a data packet, a frequency for sending a data packet, the number of data packets in one data interaction, and the like of the service supported by the UE. The auxiliary information or the subscription information of the UE can be sent to the base station by the UE in the connected state. The special service may include one or more of following service features: such as a time interval for sending the service data being greater than a certain time threshold, a size of a service data packet being less than a certain packet size, or the number of service data packets in a certain period being less than a certain packet number. For example, the special service may be a service related to internet of things, the time interval for sending the service data may be greater than or equal to half an hour, the size of the service data packet is within a few hundred bytes, or the number of the service data packets in an hour is less than 10. In the present example, only illustrative examples are given, and specific values of corresponding service features are not limited. In practical applications, the special service may be other services besides services of the internet of things, which can be configured or modified by the base station according to an actual need.

At block 302, the base station allocates the third uplink resource for the UE after the base station receives the random access request of the UE, and the base station allocates at least one SR for the UE according to the service type of the service supported by the UE.

The base station can randomly allocate the third uplink resource for the UE according to the random access request. A size of the third uplink resource may be used to transmit the BSR at least. The size of the third uplink resource is configured to indicate the amount of data that the third uplink resource can transmit.

In an example, in order to enable the UE to send the BSR to the base station timely, the base station may allocate the at least one SR resource for the UE according to the service type of the service supported by the UE after the random access request is received. The process may be: determining an amount of service data that the UE can send according to the service type of the service supported by the UE, and allocating the at least one SR resource according to the amount of service data.

The amount of the service data of different services in one data interaction can be different. The base station can determine the amount of the service data that the service supported by the UE can send in one data interaction according to the service types of different services. The amount of the service data that the UE can send may be a maximum amount of data that the service supported by the UE can send in one data interaction.

Different SR resources may correspond to different SR resource types, and different SR resource types are configured to indicate resource sizes of uplink resource allocated by the base station. For example, the SR resource type may include types such as A type, B type and C type. A resource size indicated by the A type may range from 1 to 10 bytes, a resource size indicated by the B type may range from 10 to 50 bytes, and a resource size indicated by the C type may range from 50 to 100 bytes. The base station may allocate the at least one SR resource for the UE according to the amount of the service data of the UE. A total size of resources indicated by the at least one SR resource can satisfy the transmission of service data whose size is the amount of the service data.

It is should be noted that, the base station can allocate the at least one SR resource for the UE when the UE is in the connected state. When the UE enters the inactive state, the base station may use the allocated SR resource rather than allocate new SR resource for the UE.

It is should be noted that, the SR resource is used to send the SR by the UE. The UE can transmit the SR through a physical uplink control channel (PUCCH for short). The SR resource may be configured to indicate a location where the UE transmits the SR on the PUCCH, such as a time-slot location, a subcarrier location on the PUCCH, and the like.

It is should be noted that, after the base station allocates the SR resource for the UE, the base station may store a correspondence relationship between the UE and the allocated SR resource, so that the base station can determine the UE sending an SR according to the correspondence relationship after the SR is received.

At block 303, the base station sends the given message to the UE, the given message carries configuration information of the third uplink resource and the SR resource type of the at least one SR resource.

The given message may be a random access response in the random access process, and the random access process may be the two-step random access process or the four-step random access process. When the random access process is the two-step random access process, the base station can send the random access response to the UE according to an equipment identity of the UE in the random access request. When the random access process is the four-step random access process, the random access request of the UE may carry a random access preamble, and the random access response returned by the base station also carries the same random access preamble, so that the UE determines and receives the random access response sent by the base station according to the random access preamble.

In another example, in the four-step random access process, a random access response sent at a second step by the base station may carry the configuration information of the third uplink resource, and a contention resolution message sent to the UE at a third step by the base station may carry the SR resource type of the at least one SR resource. In this case, the given message may include the random access response and the contention resolution message. A message returned at the third step of the random access process by the UE may carry identity information of the UE, and the identity information may be the same as the equipment identity, or may be different from the equipment identity. For example, the identity information may be a UE contention resolution identity, so that the base station returns the contention resolution message to the UE according to the identity information.

It should be noted that, the configuration information of the third uplink resource may be included in an uplink scheduling grant, and the configuration information of the third uplink resource is configured to indicate a time-frequency resource location and the resource size of the third uplink resource.

At block 304, after the given message is received, the UE sends currently cached second service data and the first BSR to the base station according to the third uplink resource.

The UE stores the SR resource type of at least one SR resource carried by the given message after the given message is received.

The second service data refers to service data cached by the UE when an arrival of a sub-frame corresponding to the third uplink resource is detected.

The first BSR is configured to indicate a first amount of cached data of the UE before the new service data is generated to the UE, that is, an amount of cached data indicated by the second service data. Certainly, the UE may also determine the resource size of the third uplink resource according to the configuration information of the third uplink resource, and the amount of cached data indicated by the first BSR may also be a difference value between the amount of data of the second service data and the amount of data that a size of the third uplink resource can transmit.

The UE may determine the time-frequency resource location of the third uplink resource according to the configuration information of the third uplink resource, and send the first BSR and the second service data at the determined time-frequency resource location. It should be noted that, sending of the service data refers to sending the service data cached by the UE, and whether the sent service data is all the service data cached by the UE is determined by the resource size of the third uplink resource. The example is not limited thereto.

It should be noted that, in this block, the UE may not send the first BSR to the base station, and the UE may send the first BSR through the SR resource allocated by the base station, so that the base station allocates the first uplink resource for the UE according to the first BSR.

At block 305, when the first BSR is received, the base station allocates the first uplink resource for the UE according to the first BSR, and the base station sends configuration information of the first uplink resource to the UE.

The base station may allocate the first uplink resource matching with the amount of cached data indicated by the first BSR for the UE. The meaning of "matching with" means that the base station may allocate the first uplink resource that can transmit the amount of cached data indicated by the first BSR for the UE as much as possible. The amount of data that the first uplink resource can transmit may be greater than or equal to the amount of cached data indicated by the first BSR. When the base station detects that an idle resource is less than the first BSR, or detects that a service with a high priority is also applying for resource while the idle resource is insufficient, the base station will allocate the first uplink resource for the UE according to a preset resource allocation algorithm, in which, an amount of data that the first uplink resource can transmit is less than the amount of cached data indicated by the first BSR. In this case, the base station will continue to allocate the uplink resource for the UE when the base station detects an idle resource. The preset resource allocation algorithm may be preset or changed by the base station, and the example is not limited thereto.

The first uplink resource may correspond to one or more resource blocks (RB for short), and the configuration information of the first uplink resource may include a time-frequency resource location and a resource size of the first uplink resource. The configuration information of the first uplink resource may be included in one or more uplink scheduling grants, and each uplink scheduling grant may include configuration information of the one or more RBs, and the example is not limited thereto.

At block 306, when the UE detects the new service data is generated, a BSR event is triggered, it is detected whether there is available first uplink resource currently. When it is detected that there is the available first uplink resource currently, an act at block 307 is performed, otherwise, an act at block 309 is executed.

After the UE sends the service data to the base station, it can be detected whether the new service data is generated according to a change of an amount of locally cached data. For example, the UE can periodically detect the amount of locally cached data. When an amount of cached data detected in a current cycle is greater than an amount of cached data detected in a previous cycle, it is determined that the new service data is generated. Certainly, the UE may also trigger a given event when the new service data is generated, and when the UE detects that the given event is triggered, it is determined that the new service data is generated. Alternatively, when the UE detects that there is data input at an entrance of a data cache region, it is determined that the new service data is generated.

The BSR event is configured to indicate the UE to send the second BSR to the base station. The second BSR refers to the second amount of cached data after the UE generates the new service data.

In this example, when the BSR event is triggered, the UE can send the second BSR to the base station through the uplink resource allocated by the base station to continue to apply for the uplink resource from the base station. In order to determine whether there is the available uplink resource, the UE needs to perform a detection. In an implementation, the UE may receive the given message sent by the base station, and determine the first uplink resource allocated by the base station. The first uplink resource may not be used by the UE yet. In this case, the UE may determine whether a sub-frame corresponding to the first uplink resource at a moment when the BSR is triggered is later than a current sub-frame according to the configuration information of the first uplink resource. If yes, it is determined that there is the available first uplink resource currently, otherwise, it is determined that there is no available first uplink resource currently. In another implementation, the UE does not receive the given message sent by the base station yet. In this case, the UE may determine that there is the available first uplink resource currently according to a case that the given message from the base station has not been received.

In another example, in order to avoid the base station from allocating too many uplink resources to the UE, after it is detected that the new service data is generated, the UE can determine whether the uplink resource allocated by the base station according to a previous BSR can satisfy a previous transmission of cached service data. When the uplink resource can satisfy the previous transmission of the cached service data, it indicates that the base station may not continue to allocate resource, and then the BSR event is triggered. When the uplink resource does not satisfy the previous transmission of the cached service data, it indicates that the base station may continue to allocate resource for the UE when the resource is sufficient. The resource to be allocated may be capable to transmit the new service data, and in this case, the UE does not trigger the BSR event. A process of this may be: when the UE detects that the new service data is generated, determining whether the amount of data that the first uplink resource can transmit is larger than a given percentage of the first amount of cached data according to the configuration information of the first uplink resource; when the amount of data that the first uplink resource can transmit is larger than the given percentage of the first amount of cached data, the BSR event is triggered, otherwise, the BSR event is not triggered. The given percentage may be preset by the UE, or may be preconfigured for the UE by the base station. The given percentage may be 100%, that is, the amount of data that the first uplink resource can transmit may be larger than the first amount of cached data. The example is not limited thereto.

At block 307, when the UE detects that there is the available first uplink resource currently, the second BSR and the currently cached first service data are sent to the base station based on the first uplink resource.

The first service data refers to the service data cached by the UE after the new service data is generated.

The UE may determine the time-frequency resource location of the first uplink resource according to the configuration information of the first uplink resource, and send the second BSR and the first service data at the determined time-frequency resource location. It should be noted that, sending the first service data refers to sending the service data cached by the UE, and whether the sent service data is all of the cached service data is determined by the amount of data that the first uplink resource can transmit. The example is not limited thereto.

It should be noted that, in order to avoid the base station from allocating too many uplink resources for the UE, before sending the second BSR based on the first uplink resource, the UE may perform the following acts.

At block a, it is determined whether the amount of data that the first uplink resource can transmit is not less than the second amount of cached data.

The UE can determine the amount of data that the first uplink resource can transmit according to the configuration information of the first uplink resource.

At block b, when the amount of data that the first uplink resource can transmit is not less than the second amount of cached data, an act of sending the second BSR based on the first uplink resource is executed.

At block c, when the amount of data that the first uplink resource can transmit is less than the second amount of cached data, the BSR event is canceled, and the first service data is sent based on the first uplink resource.

After the new service data is generated, by canceling the BSR event when it is detected that the uplink resources currently allocated by the base station can satisfy the transmission of all the service data locally cached, the base station will not allocate too many resources for the UE, thereby improving resource utilization.

It should be noted that, the base station may also allocate a semi-continuous scheduling resource for certain services of the UE, so that the UE can continuously occupy the semi-persistent scheduling resource in a preset time period. Therefore, when the service data sent by the UE corresponds to the semi-continuous scheduling resource, and it is in the preset time period, the UE can send the second BSR through the semi-continuous scheduling resource.

At block 308, when the base station receives the second BSR and the first service data of the UE on the first uplink resource, the base station allocates the uplink resource for the UE according to the second BSR.

A process of allocating the uplink resources for the UE according to the second BSR by the base station may include following two ways.

In a first way, when it is detected that the UE has no available first uplink resource currently, the uplink resource that can satisfy an amount of cached data indicated by the second BSR is allocated for the UE.

In a second way, when it is detected that the UE has available first uplink resource currently, a newly-increased amount of cached data of the UE is determined according to the second BSR and the first uplink resource, and the uplink resource satisfying the newly-increased amount of cached data is allocated for the UE.

The first uplink resource may correspond to multiple RBs, and each RB corresponds to one sub-frame location. When the base station receives the second BSR, it can be determined whether there is a RB having a sub-frame location located after a sub-frame location corresponding to the second BSR in the multiple RBs allocated for the UE. If yes, it is determined that the UE has the available first uplink resource currently, otherwise, it is determined that the UE has no available first uplink resource currently.

Certainly, the base station may also directly allocate the uplink resource satisfying the amount of cached data indicated by the second BSR for the UE without determining whether the UE has the available first uplink resource or not currently.

At block 309, when the UE detects that there is no available first uplink resource currently, the SR is sent to the base station according to at least one SR resource allocated by the base station.

When there is no available first uplink resource currently, the UE can apply for the uplink resource from the base station according to the SR resource allocated by the base station. A process that the UE sends the SR to the base station according to the at least one SR resource allocated by the base station may be: determining a given SR resource satisfying the second amount of cached data from the at least one SR resource according to the second amount of cached data and a SR resource type, and sending the SR on the given SR resource.

In order to avoid the UE from sending the SR frequently, the UE can also detect whether the given SR resource is in an occupied state before the SR is sent on the given SR resource. When the given SR resource is in the occupied state, the SR is sent on the given SR resource after the SR resource is out of the occupied state. When the given SR resource is not in the occupied state, the SR is sent directly on the given SR resource. In an implementation, whether the given SR resource is in the occupied state can be detected according to a state of a timer of the given SR resource. A process of this may be: detecting whether the timer of the given SR resource is in the operating state, and determining that the SR resource is in the occupied state when the timer of the given SR resource is in the operating state.

It should be noted that, when the UE sends the SR to the base station through the given SR resource, the timer of the given SR resource is initiated, so that the timer of the given SR resource is in the operating state.

At block 310, if the base station receives the SR of the UE, the second uplink resource is allocated for the UE according to the SR.

A process of allocating the second uplink resource for the UE according to the SR may be: determining the resource size indicated by the SR according to the SR resource type of the SR, and allocating the second uplink resource satisfying the resource size for the UE. As described in block 302, different SR resource types are configured to indicate the base station to allocate uplink resources of different sizes. Taking the SR resource type A in block 302 as an example, when the UE sends the SR of type A to the base station on the SR resource, the SR can indicate the base station to allocate the uplink resource of 50 to 100 bytes.

It should be noted that, after the base station allocates the second uplink resource for the UE, the configuration information of the second uplink resource can be sent to the UE. The configuration information of the second uplink resource can indicate a time-frequency resource location and the resource size of the second uplink resource.

At block 311, the UE sends the second BSR and the first service data to the base station based on the second uplink resource.

The UE may determine the time-frequency resource location of the second uplink resource according to the configuration information of the second uplink resource sent by the base station, and send the second BSR and the first service data to the base station at the determined time-frequency resource location.

It should be noted that, the UE may not send the second BSR to the base station when it is detected that the second uplink resource can transmit all of the cached service data.

At block 312, when the base station receives the second BSR and the first service data on the second uplink resource, the base station allocates the uplink resource for the UE according to the second BSR.

A process of this block is the same as that of allocating the uplink resource for the UE according to the second BSR at block 308, which will not be described here. It should be noted that, the base station may send configuration information of allocated uplink resource to the UE, and the timer of the SR resource is reset after the UE receives the configuration information.

In examples of the present disclosure, the UE may send service data of different services to the base station through different bearers. For some services, the UE may require the base station to provide a feedback on the service data of these services, so that the UE can know whether the base station receives the service data successfully. For example, the UE requires the base station to provide the feedback at a radio link control (RLC for short) layer or an application layer. However, for some other service, the UE may not require the base station to provide a feedback on corresponding service data. When the UE requires the base station to provide the feedback on the service data of a certain service, the UE may monitor the PDCCH, so as to detect whether there is feedback information of the base station on a bearer corresponding to the service. In a long term evolution (LTE for short) system, the base station may configure a unified timer for the UE. After the UE sends the service data, the timer will be initiated and the PDCCH will be monitored. When timing of the timer is ended, monitoring is stopped. However, according to whether the feedback is required and different types of the feedback, monitoring duration required for different bearers is different. For example, the monitoring is not required (that is, the monitoring duration is 0) for a bearer that does not require a feedback, and the monitoring duration of a bearer requiring a feedback at the RLC layer is different from that of a bearer requiring a feedback at an application layer. However, the base station configures the unified timer for the UE, which may lead to unnecessary monitoring of the UE, thereby wasting energy of the UE.

Therefore, in order to reduce the energy consumption of the UE, in an example of the present disclosure, the base station may configure timers of different duration for different bearers of the UE, which includes following acts.

At block 1, when it is detected that the UE may enter the inactive state, the base station determines a plurality of bearers of the UE that can perform data transmission in the inactive state.

When the UE may enter the inactive state, it can send a state switching request to the base station. The base station determines that the UE will enter the inactive state when it receives the state switching request. The base station can determine whether service data of the service supported by the UE can be transmitted in the inactive state according to the service type of the service supported by the UE. Different service types correspond to different bearers. For example, when the base station determines that a certain service type indicates the special service of block 301, it is determined that the bearer corresponding to the service type can perform data transmission in the inactive state.

At block 2, for each bearer of the plurality of bearers, the base station configures timer duration for the bearer according to a feedback type corresponding to the bearer.

The base station can determine whether a feedback of the UE is required for the service data of the service supported by the UE according to auxiliary information of the service supported by the UE. For any service, the auxiliary information may include the service type of the service and feedback-related information of the service when one data interaction is performed on the service. The feedback-related information includes the feedback type of a required feedback. The feedback type includes the RLC layer feedback or/and the application layer feedback.

For any one bearer of the UE, the base station can determine feedback duration required by the bearer according to a feedback type of the bearer, and then the base station can configure the timer duration for the bearer according to the feedback duration. For example, the configured timer duration may be the feedback duration. Alternatively, considering a time delay problem, the timer duration may be slightly greater than the feedback duration. For example, when the bearer does not require a feedback, the timer duration configured for the bearer is 0, and certainly, the timer duration may not be configured for the bearer. When the bearer requires the RLC layer feedback, duration satisfying the RLC layer feedback is configured for the bearer, such that the duration guarantees the UE to receive the RLC layer feedback returned by the base station after the service data is sent. Similarly, when the bearer requires the application layer feedback, duration satisfying the application layer feedback is configured for the bearer. When the bearer requires both the RLC layer feedback and the application layer feedback, a greater one in the feedback duration of the RLC layer feedback and the application layer feedback is configured as the duration of the bearer.

At block 3, the base station sends timer configuration information to the UE, and the timer configuration information is configured to indicate timer duration of each bearer of the plurality of bearers.

When base station sends the state switching instruction to the UE, the state switching instruction may carry the timer configuration information. The state switch instruction is configured to indicate the UE to switch from the connected state to the inactive state. The timer configuration information may include a correspondence relationship between a bearer identity of each bearer and the timer duration.

At block 4, after the UE receives the timer configuration information of the base station, the UE configures the timer of each bearer according to the timer configuration information.

After the timer configuration information is received by the UE, for each bearer, the UE configures the timer for the bearer according to the timer duration corresponding to the bearer, that is, timing of the timer of the bearer is set to be corresponding timer duration.

At block 5, after the service data is sent to the base station by the UE, the UE initiates the timer of the bearer corresponding to the service data.

For example, in the above block 307, after the second BSR and the first service data are sent to the base station, the UE can determine a given bearer from the plurality of bearers according to the service type of the first service data. The UE initiates a timer of the given bearer to make the timer of the given bearer enter the operating state. The given bearer is a bearer configured to transmit the first service data. The UE monitors the PDCCH when the timer of the given bearer is in the operating state.

It should be noted that, when the UE sends the service data, if the timer of corresponding bearer is in the operating state, the timer may be reset. Alternatively, when the UE receives downlink service data, the timer is reset. Alternatively, when the UE sends the SR to the base station, the timer is reset.

In an example of the present, that the UE stops monitoring the PDCCH, includes following two cases.

In a first case, the UE detects operating states of the timers of the plurality of bearers in real time. When it is detected that the timers of the plurality of bearers are in the non-operating state, monitoring the PDCCH is stopped.

In a second case, when the UE receives the stop-monitoring instruction sent by the base station, monitoring the PDCCH is stopped.

In the second case, the base station may send the stop-monitoring instruction to the UE when an unpredictable situation is detected. The unpredictable situation may be a failure, a network interruption and so on. The stop-monitoring instruction may be sent to the UE through an MAC control element, and the stop-monitoring instruction may be a PDCCH command or the like.

It should be noted that, when the UE stops monitoring the PDCCH, the UE may release the SR resource.

With the method according to examples of the present disclosure, when new service data is generated in the UE, the BSR event is triggered, and an updated BSR may be sent to the base station timely according to the available uplink resource or uplink resource requested according to the SR resource allocated by the base station, so that the base station can continue to allocate the uplink resource for the UE according to the updated BSR, without initiating a random access process by the UE, thereby improving efficiency of resource allocation and reducing signaling overhead. In addition, by configuring different timer duration for different bearers, the UE can avoid unnecessary PDCCH monitoring, thereby saving energy consumption of the UE.

Figure 4:
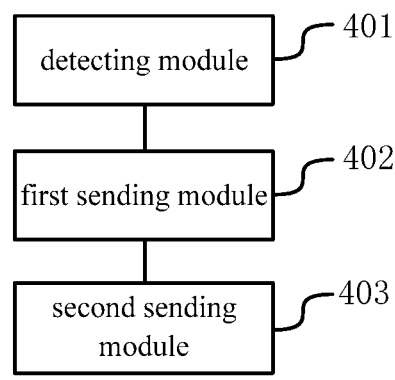
FIG. 4 is a block diagram illustrating a resource allocation device according to an example.

FIG. 4 is a block diagram illustrating a resource allocation device according to an example. Referring to FIG. 4, the device includes a detecting module 401, a first sending module 402 and a second sending module 403.

The detecting module 401 is connected with the first sending module 402. The detecting module 401 is configured to trigger a BSR event when new service data is detected to be generated after a first BSR is sent to a base station in an inactive state. The BSR event is configured to indicate to send of a second BSR to the base station. The first BSR is configured to indicate a first amount of cached data of a UE before the new service data is generated. The second BSR is configured to indicate a second amount of cached data of the UE after the new service data is generated.

The first sending module 402 is connected with the second sending module 403. The first sending module 402 is configured to send the second BSR and currently cached first service data to the base station based on a first uplink resource when detecting that there is the available first uplink resource currently. The base station allocates an uplink resource for the UE according to the second BSR, and the first uplink resource is allocated by the base station according to the first BSR.

The second sending module 403 is configured to send a SR to the base station according to at least one SR resource allocated by the base station when detecting that there is no available first uplink resource currently. The base station allocates a second uplink resource for the UE according to the SR. The at least one SR resource is allocated by the base station according to a random access request of the UE. The second sending module 403 is configured to send the second BSR and the first service data to the base station based on the second uplink resource. The base station allocates the uplink resource for the UE according to the second BSR.

In an alternative implementation, the device further includes a determining module.

The determining module is configured to determine whether an amount of data that the first uplink resource can transmit is larger than a given percentage of the first amount of cached data according to the configuration information of the first uplink resource when receiving configuration information of the first uplink resource.

The detecting module is configured to perform an act of triggering the BSR event when the amount of data that the first uplink resource can transmit is larger than the given percentage of the first amount of cached data.

In an alternative implementation, the first sending module 402 is configured to determine whether the amount of data that the first uplink resource can transmit is not larger than or equal to the second amount of cached data, to perform an act of sending the second BSR and the first service data based on the first uplink resource when the amount of data that the first uplink resource can transmit is larger than or equal to the second amount of cached data, and to cancel the BSR event and to send the first service data based on the first uplink resource when the amount of data that the first uplink resource can transmit is less than the second amount of cached data.

In an alternative implementation, the second sending module 403 is configured to determine a given SR resource satisfying the second amount of cached data from the at least one SR resource according to the second amount of cached data and a SR resource type, and to send the SR on the given SR resource. Different SR resource types correspond to different resource sizes.

In an alternative implementation, the detecting module 401 is further configured to detect whether the given SR resource is in an occupied state, to perform an act of sending the SR on the given SR resource after the SR resource is out of the occupied state if the SR resource is in the occupied state, and to perform an act of sending the SR on the given SR resource if the SR resource is not in the occupied state.

In an alternative implementation, the detecting module 401 is configured to detect whether a timer of the given SR resource is in an operating state, and to determine that the SR resource is in the occupied state when the timer of the given SR resource is in the operating state.

In an alternative implementation, the device further includes a third sending module.

The third sending module is configured to send the random access request to the base station when detecting that there is service data to be sent in the inactive state. The base station allocates a third uplink resource and at least one SR resource for the UE according to a service type of a service supported by the UE after the base station receives the random access request. The third sending module is configured to send currently cached second service data and the first BSR to the base station according to the third uplink resource.

In an alternative implementation, the determining module is further configured to determine a given bearer from a plurality of bearers established with the base station according to the service type of the first service data. The given bearer is configured to transmit the first service data.

The device further includes a starting module.

The starting module is configured to start a timer of the given bearer to make the timer of the given bearer enter an operating state.

In an alternative implementation, the device further includes a receiving module and a configuring module.

The receiving module is configured to receive timer configuration information of the base station. The timer configuration information is configured to indicate timer duration of each bearer of the plurality of bearers.

The configuring module is configured to configure a timer of each bearer according to the timer duration of each bearer.

In an alternative implementation, the device further includes a monitoring module.

The monitoring module is configured to detect operating states of timers of the plurality of bearers, and to stop monitoring a PDCCH when detecting that the timers of the plurality of bearers are in a non-operating state.

The monitoring module is further configured to stop monitoring the PDCCH when receiving a stop-monitoring instruction from the base station.

With the device according to examples of the present disclosure, when the new service data is generated in the UE, the BSR event is triggered, and an updated BSR may be sent to the base station timely according to the available uplink resource or the uplink resource requested according to the SR resource allocated by the base station, so that the base station can continue to allocate uplink resource for the UE according to the updated BSR, without initiating the random access process by the UE, thereby improving efficiency of resource allocation and reducing signaling overhead.

Figure 5:
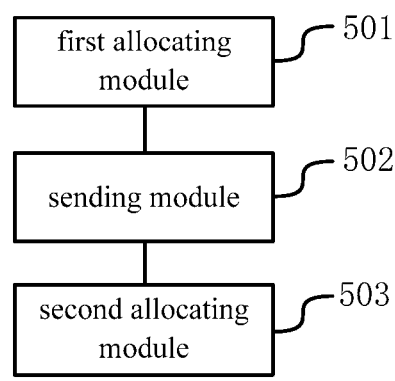
FIG. 5 is a block diagram illustrating a resource allocation device according to another example.

FIG. 5 is a block diagram illustrating a resource allocation device according to another example. Referring to FIG. 5, the device includes a first allocating module 501, a sending module 502 and a second allocating module 503.

The first allocating module 501 is connected with the sending module 502. The first allocating module 501 is configured to allocate a first uplink resource for a UE according to a first BSR when receiving the first BSR of the UE and when the UE is in an inactive state.

The sending module 502 is connected to the second allocating module 503. The sending module 502 is configured to send configuration information of the first uplink resource to the UE.

The second allocating module 503 is configured to allocate an uplink resource for the UE according to a second BSR when receiving the second BSR and first service data of the UE on the first uplink resource.

The second allocating module 503 is further configured to allocate a second uplink resource for the UE according to a SR when receiving the SR of the UE, and to allocate the uplink resource for the UE according to the second BSR when receiving the second BSR and the first service data on the second uplink resource.

The second BSR is sent by the UE when the UE detects new service data is generated. The first BSR is configured to indicate a first amount of cached data of the UE before the new service data is generated. The second BSR is configured to indicate a second amount of cached data of the UE after the new service data is generated.

In an alternative implementation, the second allocating module 503 is configured to determine a resource size indicated by the SR according to a SR resource type of the SR, and to allocate the second uplink resource satisfying the resource size for the UE.

In an alternative implementation, the receiving module is further configured to receive a random access request of the UE.

The device further includes a third allocating module.

The third allocating module is configured to allocate a third uplink resource for the UE. The UE sends the first BSR on the third uplink resource.

The third allocating module is further configured to allocate at least one SR resource for the UE according to a service type of a service supported by the UE.

The sending module 502 is further configured to send a given message to the UE. The given message carries configuration information of the third uplink resource and the SR resource type of the at least one SR resource. Different SR resource types are configured to indicate the base station to allocate uplink resources of different sizes.

In an alternative implementation, the third allocating module is configured to determine an amount of service data that the UE can send according to the service type of the service supported by the UE, and to allocate the at least one SR resource according to the amount of service data that the UE can send.

In an alternative implementation, the second allocating module 503 is configured to allocate an uplink resource satisfying the second amount of cached data indicated by the second BSR for the UE when detecting that the UE has no available first uplink resource currently, or to determine newly-increased amount of cached data of the UE according to the second BSR and the first uplink resource when detecting that the UE has available first uplink resource currently, and to allocate the uplink resource satisfying the newly-increased amount of cached data for the UE.

In an alternative implementation, the device further includes a determining module and a configuring module.

The determining module is configured to determine a plurality of bearers of the UE that have a capacity to perform data transmission in the inactive state when detecting that the UE needs to enter the inactive state.

The configuring module is configured to, for each bearer of the plurality of bearers, configure timer duration for the bearer according to a feedback type corresponding to the bearer.

The sending module 502 is further configured to send timer configuration information to the UE. The timer configuration information is configured to indicate the timer duration of each bearer of the plurality of bearers, and the UE configures a timer of each bearer according to the timer configuration information.

With the device according to examples of the present disclosure, when the new service data is generated in the UE, the BSR event is triggered, and an updated BSR may be sent to the base station timely according to the available uplink resource or the uplink resource requested according to the SR resource allocated by the base station, so that the base station can continue to allocate uplink resource for the UE according to the updated BSR, without initiating a random access process by the UE, thereby improving efficiency of resource allocation and reducing signaling overhead.

With respect to the devices in the above examples, the specific manners for performing operations for individual modules therein have been described in detail in the examples regarding the methods, which will not be elaborated herein.

Figure 6:
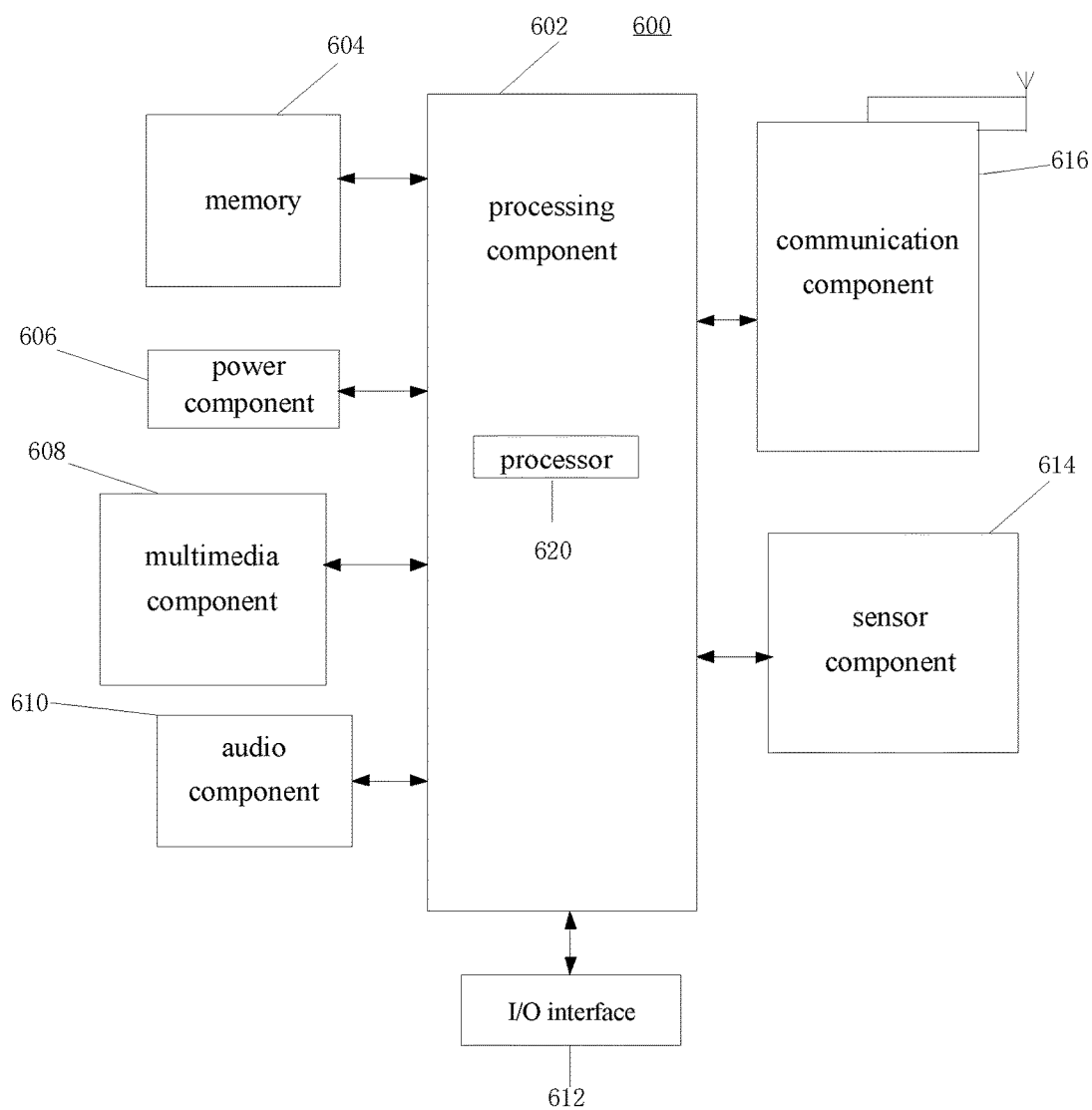
FIG. 6 is a schematic diagram illustrating a user equipment according to an example.

FIG. 6 is a schematic diagram illustrating a user equipment according to an example. For example, the UE 600 may be a mobile phone, a computer, a digital broadcasting terminal, a message transceiver device, a game console, a tablet device, a medical device, a fitness device and a personal digital assistant, etc.

Referring to FIG. 6. The user equipment 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the user equipment 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the user equipment 600. Examples of such data include instructions for any applications or methods operated on the user equipment 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the user equipment 600. The power component 606 may include a power management system, one or more power sources, and any other components associated with the generation, management, and distribution of power in the user equipment 600.

The multimedia component 608 includes a screen providing an output interface between the user equipment 600 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some examples, the multimedia component 608 includes a front-facing camera and/or a rear-facing camera. When the user equipment 600 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 610 is configured to output and/or input audio signals. For example, the audio component 610 includes a microphone ("MIC") configured to receive an external audio signal when the user equipment 600 is in an operation mode, such as a call mode, a recording mode, and a voice recognition mode. The received audio signal may be further stored in the memory 604 or transmitted via the communication component 616. In some examples, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the user equipment 600. For instance, the sensor component 614 may detect an open/closed status of the user equipment 600, relative positioning of components, e.g., the display and the keypad, of the user equipment 600, a change in position of the user equipment 600 or a component of the user equipment 600, a presence or absence of user contact with the user equipment 600, an orientation or an acceleration/deceleration of the user equipment 600, and a change in temperature of the user equipment 600. The sensor component 614 may include a proximity sensor configured to detect the presence of nearby objects without any physical contact. The sensor component 614 may also include a light sensor, such as a CMOS or CCD image sensor, for use in imaging applications. In some examples, the sensor component 614 may also include an accelerometer sensor, a gyroscope sensor, a magnetic sensor, a pressure sensor, or a temperature sensor.

The communication component 616 is configured to facilitate communication, wired or wirelessly, between the user equipment 600 and other devices. The user equipment 600 can access a wireless network based on a communication standard, such as WiFi, 2G, or 3G, or a combination thereof. In one example, the communication component 616 receives a broadcast signal or broadcast associated information from an external broadcast management system via a broadcast channel. In one example, the communication component 616 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In examples, the user equipment 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In examples, there is also provided a non-transitory computer-readable storage medium including instructions, such as included in the memory 604, executable by the processor 620 in the user equipment 600, for performing the above-described methods. For example, the non-transitory computer-readable storage medium may be a ROM, a RAM, a CD-ROM, a magnetic tape, a floppy disc, an optical data storage device, and the like.

In examples, there is also provided a non-transitory computer-readable storage medium including instructions, when the instructions are executed by the processor inside the user equipment 600, the user equipment 600 can execute the resource allocation method described above.

Figure 7:
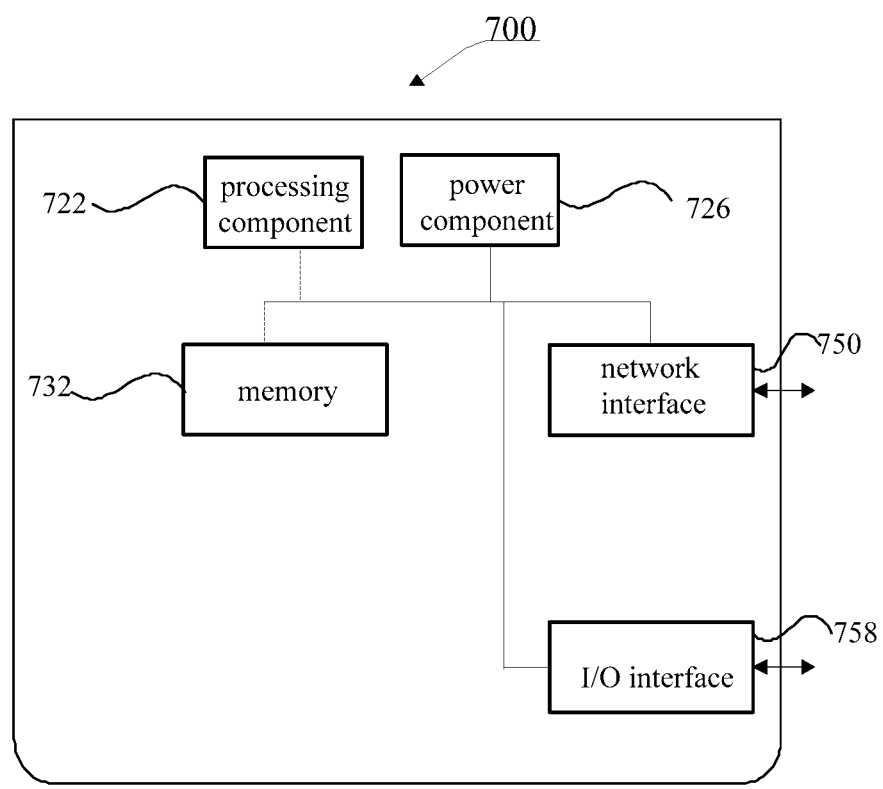
FIG. 7 is a schematic diagram illustrating a base station according to another example.

FIG. 7 is a schematic diagram illustrating a base station according to another example. Referring to FIG. 7, the base station 700 includes a processing component 722, and the processing component 722 further includes one or more processors and a memory resource represented by a memory 732. The memory resource is configured to store instructions executable by the processing component 722, such as application programs. The application program stored in the memory 732 may include one or more modules corresponding to a set of instructions. In addition, the processing component 722 is configured to the method executed by the base station in the resource allocation method example described above.

The base station 700 further includes a power component 726 configured to execute power management of the base station 700, a wired or wireless network interface 750 configured to connect the base station 700 to the network, and an input/output (I/O) interface 758. The base station 700 may operate based on an operating system stored in the memory 732, such as Windows Server™, Mac OS X™, Unix™, Linux™, Free BSD™, or the like.

According to a first aspect of the present disclosure, there is provided a resource allocation method, applied in a user equipment (UE for short), including: in an inactive state, triggering a buffer status report (BSR for short) event when new service data is detect to be generated after a first BSR is sent to a base station, in which, the BSR event is configured to indicate to send a second BSR to the base station, the first BSR is configured to indicate a first amount of cached data of the UE before the new service data is generated, and the second BSR is configured to indicate a second amount of cached data of the UE after the new service data is generated; when detecting that there is an available first uplink resource currently, sending the second BSR and currently cached first service data to the base station based on the first uplink resource, in which, the base station allocates an uplink resource for the UE according to the second BSR, and the first uplink resource is allocated by the base station according to the first BSR; and when detecting that there is no first uplink resource currently, sending a scheduling request (SR for short) to the base station according to at least one SR resource allocated by the base station, in which, the base station allocates a second uplink resource for the UE according to the SR, the at least one SR resource is allocated by the base station according to a random access request of the UE, and sending the second BSR and the first service data to the base station based on the second uplink resource, in which the base station allocates the uplink resource for the UE according to the second BSR.

According to a second aspect of the present disclosure, there is provided a resource allocation method, applied in a base station, including: when a UE is in an inactive state, allocating a first uplink resource for the UE according to a first BSR when receiving the first BSR of the UE; sending configuration information of the first uplink resource to the UE; allocating an uplink resource for the UE according to a second BSR when receiving the second BSR and first service data of the UE on the first uplink resource; and allocating a second uplink resource for the UE according to a SR when receiving the SR of the UE, and allocating the uplink resource for the UE according to the second BSR when receiving the second BSR and the first service data on the second uplink resource; in which, the second BSR is sent by the UE when the UE detects that new service data is generated, the first BSR is configured to indicate a first amount of cached data of the UE before the new service data is generated, and the second BSR is configured to indicate a second amount of cached data of the UE after the new service data is generated.

According to a third aspect of the present disclosure, there is provided a resource allocation device, including: a detecting module, a first sending module and a second sending module.

The detecting module is configured to trigger a BSR event when new service data is detected to be generated after a first BSR is sent to a base station in an inactive state, in which, the BSR event is configured to indicate to send a second BSR to the base station, the first BSR is configured to indicate a first amount of cached data of a UE before the new service data is generated, and the second BSR is configured to indicate a second amount of cached data of the UE after the new service data is generated.

The first sending module is configured to send the second BSR and currently cached first service data to the base station based on a first uplink resource when detecting that there is the available first uplink resource currently, in which, the base station allocates an uplink resource for the UE according to the second BSR, and the first uplink resource is allocated by the base station according to the first BSR.

The second sending module is configured to send a SR to the base station according to at least one SR resource allocated by the base station when detecting that there is no available first uplink resource currently, in which, the base station allocates a second uplink resource for the UE according to the SR, and the at least one SR resource is allocated by the base station according to a random access request of the UE, and to send the second BSR and the first service data to the base station based on the second uplink resource, in which the base station allocates the uplink resource for the UE according to the second BSR.

According to a fourth aspect of the present disclosure, there is provided a resource allocation device, including: a first allocating module, a sending module and a second allocating module.

The first allocating module is configured to allocate a first uplink resource for a UE according to a first BSR when receiving the first BSR of the UE and when the UE is in an inactive state.

The sending module is configured to send configuration information of the first uplink resource to the UE.

The second allocating module is configured to allocate an uplink resource for the UE according to a second BSR when receiving the second BSR and first service data of the UE on the first uplink resource.

The second allocating module is further configured to allocate a second uplink resource for the UE according to a SR when receiving the SR of the UE; and to allocate the uplink resource for the UE according to the second BSR when receiving the second BSR and the first service data on the second uplink resource.

The second BSR is sent by the UE when the UE detects new service data is generated. The first BSR is configured to indicate a first amount of cached data of the UE before the new service data is generated. The second BSR is configured to indicate a second amount of cached data of the UE after the new service data is generated.

According to a fifth aspect of the present disclosure, there is provided a UE, including a processor and a memory. The memory is configured to store instructions executable by the processor.

The processor is configured to: in an inactive state, trigger a BSR event when new service data is detect to be generated after a first BSR is sent to a base station, in which, the BSR event is configured to indicate to send a second BSR to the base station, the first BSR is configured to indicate a first amount of cached data of the UE before the new service data is generated, and the second BSR is configured to indicate a second amount of cached data of the UE after the new service data is generated; send the second BSR and currently cached first service data to the base station based on a first uplink resource when detecting that there is the available first uplink resource currently, in which, the base station allocates an uplink resource for the UE according to the second BSR, and the first uplink resource is allocated by the base station according to the first BSR; and send a SR to the base station according to at least one SR resource allocated by the base station when detecting that there is no available first uplink resource currently, in which, the base station allocates a second uplink resource for the UE according to the SR, and the at least one SR resource is allocated by the base station according to a random access request of the UE; and send the second BSR and the first service data to the base station based on the second uplink resource, in which the base station allocates the uplink resource for the UE according to the second BSR.

According to a sixth aspect of the present disclosure, there is provided a base station device, including a receiver, a transmitter, a memory and a processor. The receiver, the transmitter and the memory are connected with the processor respectively. The memory is configured to store instructions executable by the processor.

The processor is configured to: when a UE is in an inactive state, allocate a first uplink resource for the UE according to a BSR when receiving the first BSR of the UE; send configuration information of the first uplink resource to the UE; allocate an uplink resource for the UE according to a second BSR when receiving the second BSR and first service data of the UE on the first uplink resource; and allocate a second uplink resource for the UE according to a SR when receiving the SR of the UE, and allocate the uplink resource for the UE according to the second BSR when receiving the second BSR and the first service data on the second uplink resource.

The second BSR is sent by the UE when the UE detects new service data is generated, the first BSR is configured to indicate a first amount of cached data of the UE before the new service data is generated, and the second BSR is configured to indicate a second amount of cached data of the UE after the new service data is generated.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A resource allocating method, applied in a UE, comprising:
   in an inactive state, triggering a buffer status report (BSR) event when new business data are generated after a first BSR is sent to a base station, wherein the BSR event is configured to indicate to send a second BSR to the base station, and the first BSR is configured to indicate a first amount of cached data of the UE before the new business data are generated and the second BSR is configured to indicate a second amount of cached data of the UE after the new business data are generated;
   when detecting that a first uplink resource is available, sending the second BSR and cached first business data to the base station using the first uplink resource, wherein the base station allocates an uplink resource for the UE according to the second BSR, and the first uplink resource is allocated by the base station according to the first BSR; and
   when detecting that the first uplink resource is not available, sending a scheduling request (SR) to the base station according to at least one SR resource allocated by the base station wherein the base station allocates a second uplink resource for the UE according to the SR, and the at least one SR resource is allocated by the base station according to a random access request of the UE, and sending the second BSR and the first business data to the base station using the second uplink resource wherein the base station allocates the uplink resource for the UE according to the second BSR.

2. The method according to claim 1, before triggering the BSR event, further comprising:
   when receiving configuration information of the first uplink resource, determining whether an amount of data transmitted by the first uplink resource is larger than a given percentage of the first amount of cached data according to the configuration information of the first uplink resource; and
   triggering the BSR event when the amount of data transmitted by the first uplink resource is larger than the given percentage of the first amount of cached data.

3. The method according to claim 1, before sending the second BSR using the first uplink resource, further comprising:
   determining whether the amount of data transmitted by the first uplink resource is larger than or equal to the second amount of cached data;
   when the amount of data transmitted by the first uplink resource is larger than or equal to the second amount of cached data, sending the second BSR and the first business data using the first uplink resource; and
   when the amount of data transmitted by the first uplink resource is less than the second amount of cached data, canceling the BSR event and sending the first business data using the first uplink resource.

4. The method according to claim 1, wherein sending the SR to the base station according to at least one SR resource allocated by the base station comprises:
   determining a given SR resource satisfying the second amount of cached data from the at least one SR resource according to the second amount of cached data and a SR resource type, wherein the SR resource type is one of different SR resource types that correspond to different resource sizes; and
   sending the SR using the given SR resource.

5. The method according to claim 4, before sending the SR using the given SR resource, further comprising:
   detecting whether the given SR resource is in an occupied state;
   when the given SR resource is in the occupied state, sending the SR using the given SR resource after the given SR resource is out of the occupied state;
   when the given SR resource is not in the occupied state, sending the SR using the given SR resource;
   detecting whether a timer of the given SR resource is in an operating state; and
   determining that the given SR resource is in the occupied state when the timer of the given SR resource is in the operating state.

6. The method according to claim 1, further comprising:
   in the inactive state, sending the random access request to the base station when detecting that business data are to be sent, wherein the base station allocates a third uplink resource and at least one SR resource for the UE according to a business type of a business supported by the UE after the base station receives the random access request; and
   sending cached second business data and the first BSR to the base station according to the third uplink resource.

7. The method according to claim 1, after sending the second BSR and the first business data to the base station, further comprising:
   determining a given bearer from a plurality of bearers established with the base station according to a business type of the first business data, wherein the given bearer is configured to transmit the first business data; and
   starting a timer of the given bearer so as to make the timer of the given bearer enter an operating state.

8. The method according to claim 7, before starting the timer of the given bearer, further comprising:
   receiving timer configuration information of the base station, wherein the timer configuration information is configured to indicate a timer duration of each bearer of the plurality of bearers; and
   configuring a timer of each bearer according to the timer duration of each bearer.

9. The method according to claim 7, further comprising:
   detecting operating states of timers of the plurality of bearers;
   stopping monitoring a physical downlink control channel (PDCCH) when detecting that the timers of the plurality of bearers are in a non-operating state; or
   stopping monitoring the PDCCH when receiving a stop-monitoring instruction from the base station.

10. A resource allocating method, applied in a base station, comprising:
    when a UE is in an inactive state, allocating a first uplink resource for the UE according to a first BSR when receiving the first BSR from the UE;
    sending configuration information of the first uplink resource to the UE;
    allocating an uplink resource for the UE according to a second BSR when receiving the second BSR and first business data from the UE on the first uplink resource; and
    allocating a second uplink resource for the UE according to a scheduling request (SR) when receiving the SR of the UE, and allocating the uplink resource for the UE according to the second BSR when receiving the second BSR and the first business data on the second uplink resource;

wherein the second BSR is sent by the UE when the UE detects that new business data are generated, and the first BSR is configured to indicate a first amount of cached data of the UE before the new business data are generated and the second BSR is configured to indicate a second amount of cached data of the UE after the new business data are generated.

11. The method according to claim 10, wherein allocating the second uplink resource for the UE according to the SR comprises:
determining a resource size indicated by the SR according to a SR resource type of the SR; and
allocating the second uplink resource satisfying the resource size for the UE.

12. The method according to claim 10, further comprising:
receiving a random access request of the UE;
allocating a third uplink resource for the UE, wherein the UE sends the first BSR on the third uplink resource;
allocating at least one SR resource for the UE according to a business type of a business supported by the UE; and
sending a given message to the UE, wherein the given message carries configuration information of a third uplink resource and a SR resource type of the at least one SR resource, and the SR resource type is one of different SR resource types that are configured to indicate the base station to allocate uplink resources of different sizes;
wherein allocating the at least one SR resource for the UE according to the business type of the business supported by the UE comprises:
determining an amount of business data sent by the UE according to the business type of the business supported by the UE; and
allocating the at least one SR resource according to the amount of business data.

13. The method according to claim 10, wherein allocating the uplink resource for the UE according to the second BSR comprises:
when detecting that the UE does not have the first uplink resource available, allocating an uplink resource satisfying the second amount of cached data indicated by the second BSR for the UE; or
when detecting that the UE has the first uplink resource available, determining newly-increased amount of cached data of the UE according to the second BSR and the first uplink resource, and allocating an uplink resource satisfying the newly-increased amount of cached data for the UE.

14. The method according to claim 10, further comprising:
determining a plurality of bearers of the UE that have a capacity to perform data transmission in the inactive state when detecting that the UE enters the inactive state;
for each bearer of the plurality of bearers, configuring a timer duration for the bearer according to a feedback type corresponding to the bearer; and
sending timer configuration information to the UE, wherein the timer configuration information is configured to indicate the timer duration of each bearer of the plurality of bearers, and the UE configures a timer of each bearer according to the timer configuration information.

15. A user equipment, comprising:
a processor; and
a memory storing instructions that are executable by the processor;
wherein the processor is configured to:
in an inactive state, trigger a BSR event when new business data are generated after a first BSR is sent to a base station, wherein the BSR event is configured to indicate to send a second BSR to the base station, and the first BSR is configured to indicate a first amount of cached data of the UE before the new business data are generated and the second BSR is configured to indicate a second amount of cached data of the UE after the new business data are generated;
send the second BSR and cached first business data to the base station using a first uplink resource when detecting that the first uplink resource is available, wherein the base station allocates an uplink resource for the UE according to the second BSR, and the first uplink resource is allocated by the base station according to the first BSR; and
send a SR to the base station according to at least one SR resource allocated by the base station when detecting that the first uplink resource is not available, wherein the base station allocates a second uplink resource for the UE according to the SR, and the at least one SR resource is allocated by the base station according to a random access request of the UE, and send the second BSR and the first business data to the base station using the second uplink resource, wherein the base station allocates the uplink resource for the UE according to the second BSR.

16. The user equipment according to claim 15, wherein the processor is further configured to:
determine whether an amount of data transmitted by the first uplink resource is large r than a given percentage of the first amount of cached data according to configuration information of the first uplink resource when receiving the configuration information of the first uplink resource; and
trigger the BSR event when the amount of data transmitted by the first uplink resource is larger than the given percentage of the first amount of cached data.

17. The user equipment according to claim 15, wherein the processor is configured to:
determine whether the amount of data transmitted by the first uplink resource is larger than or equal to the second amount of cached data;
send the second BSR and the first business data based using the first uplink resource when the amount of data transmitted by the first uplink resource is larger than or equal to the second amount of cached data; and
cancel the BSR event and send the first business data based using the first uplink resource when the amount of data transmitted by the first uplink resource is less than the second amount of cached data.

18. The user equipment according to claim 15, wherein the processor is configured to:
determine a given SR resource satisfying the second amount of cached data from the at least one SR resource according to the second amount of cached data and a SR resource type, wherein the SR resource type is one of different SR resource types that correspond to different resource sizes; and
send the SR using the given SR resource.

19. The user equipment according to claim 18, wherein the processor is configured to:
- detect whether the given SR resource is in an occupied state;
- send the SR using the given SR resource after the given SR resource is out of the occupied state when the given SR resource is in the occupied state;
- send the SR using the given SR resource when the given SR resource is not in the occupied state;
- detect whether a timer of the given SR resource is in an operating state; and determine that the given SR resource is in the occupied state when the timer of the given SR resource is in the operating state.

* * * * *